(12) United States Patent
Andre

(10) Patent No.: US 7,015,675 B1
(45) Date of Patent: Mar. 21, 2006

(54) PORTABLE POWER TOOL AND POWER SUPPLY COMBINATION

(76) Inventor: Jorge Andre, 17636 SW. 20th St., Miramar, FL (US) 33029

( * ) Notice: Subject to any disclaimer, the term of this patent is extended or adjusted under 35 U.S.C. 154(b) by 130 days.

(21) Appl. No.: 10/769,236

(22) Filed: Feb. 2, 2004

(51) Int. Cl.
*H01M 10/46* (2006.01)

(52) U.S. Cl. ..................................................... 320/114

(58) Field of Classification Search ................ 320/107, 320/114, 115; D13/107, 108
See application file for complete search history.

(56) References Cited

U.S. PATENT DOCUMENTS

| | | | |
|---|---|---|---|
| 3,828,201 A | 8/1974 | Allan, Sr. | |
| 3,919,615 A | 11/1975 | Niecke | |
| D280,317 S | 8/1985 | Boyd et al. | |
| 4,748,344 A | 5/1988 | Sing | |
| 5,929,597 A | 7/1999 | Pfeifer et al. | |
| 6,909,260 B1 * | 6/2005 | Parker | 320/107 |
| 2001/0035738 A1 | 11/2001 | Person | |

* cited by examiner

*Primary Examiner*—Edward H. Tso

(57) ABSTRACT

A portable power tool and power supply combination includes an electrically powered drill assembly having a first power port electrically coupled thereto. A housing has a bottom wall, a top wall and a peripheral wall. The top wall has a well extending therein and including first electrical contacts mounted therein. A rechargeable battery is provided having second electrical contacts electrically coupled thereto. The second electrical contacts are removably positionable in the well aid positioned for electrically engaging the first electrical contacts. A second power port is mounted on the housing and is electrically coupled to the first electrical contacts. A power cord is elongated and includes a first end and a second end. A pair of power couplers each adapted for electrically coupling to one of the first and second power ports is electrically coupled to one of the first and second ends of the power cord.

6 Claims, 9 Drawing Sheets

PORTABLE POWER TOOL AND POWER SUPPLY COMBINATION

BACKGROUND OF THE INVENTION

1. Field of the Invention

The present invention relates to portable power tool devices and more particularly pertains to a new portable power tool device that includes a portable power supply which is connected to a power tool via a power cord so that both the weight and size of the power tool is reduced.

2. Description of the Prior Art

The use of portable power tool devices is known in the prior art. While these devices fulfill their respective, particular objectives and requirements, the need remains for a power drill assembly which is smaller and lighter for easier use and for reaching narrow areas.

SUMMARY OF THE INVENTION

The present invention meets the needs presented above by generally including an electrically powered drill assembly having a first power port electrically coupled thereto. A housing has a bottom wall, a top wall and a peripheral wall extending between and is attached to the top and bottom walls. The top wall has a well extending therein. A rechargeable battery is provided. A plurality of electrical contacts includes at least a pair of first electrical contacts mounted in the well and at least a pair of second electrical contacts mounted on and electrically coupled to the battery. The second electrical contacts are removably positionable in the well and positioned for electrically engaging the first electrical contacts. A second power port is mounted on the housing and is electrically coupled to the first electrical contacts. A power cord is elongated and includes a first end and a second end. A pair of power couplers each adapted for electrically coupling to one of the first and second power ports is electrically coupled to one of the first and second ends of the power cord.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
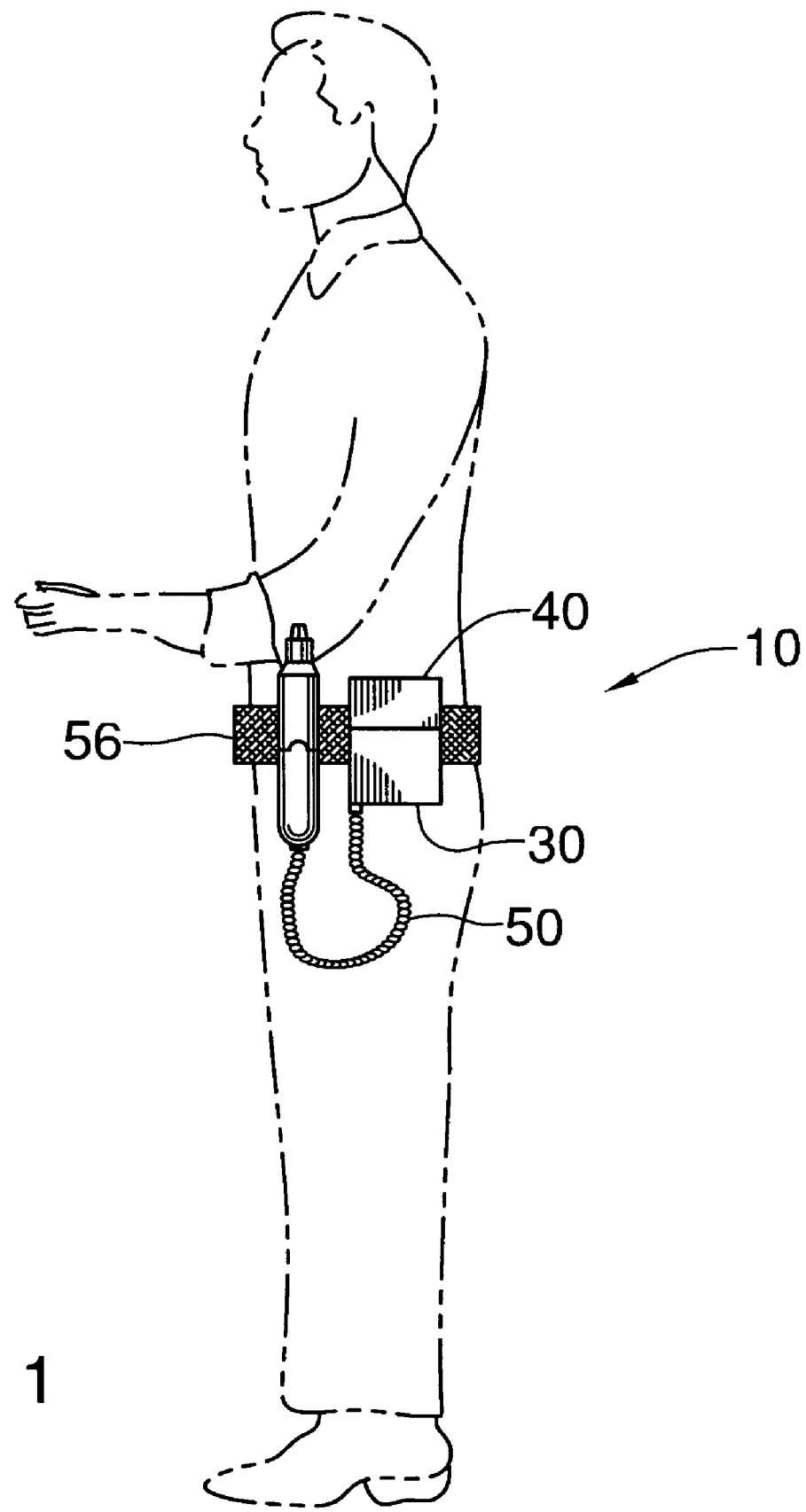
FIG. 1 is a schematic side view of a portable power tool and power supply combination according to the present invention.
Figure 2:
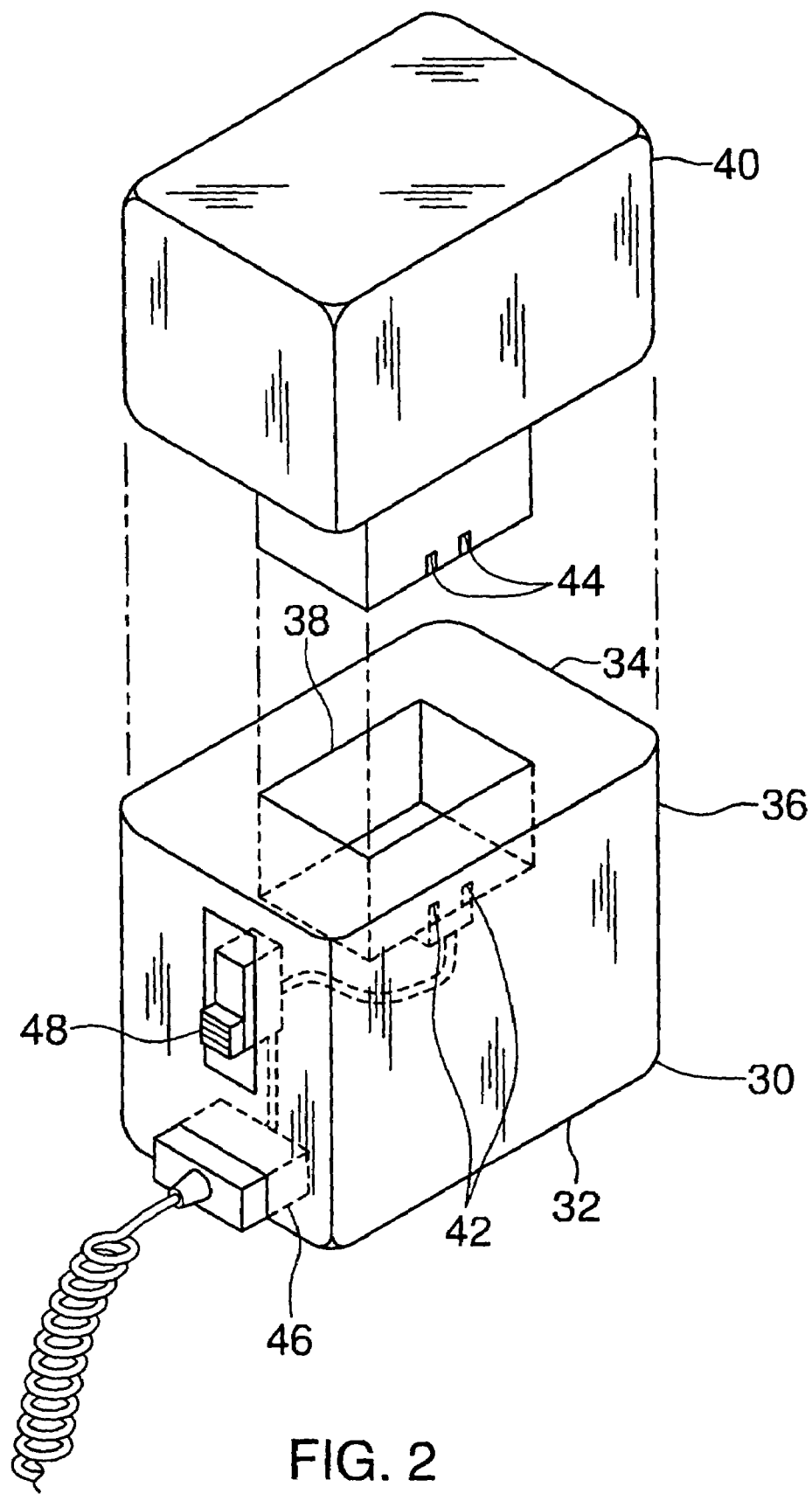
FIG. 2 is a schematic perspective front view of the battery and housing of the present invention.
Figure 3:
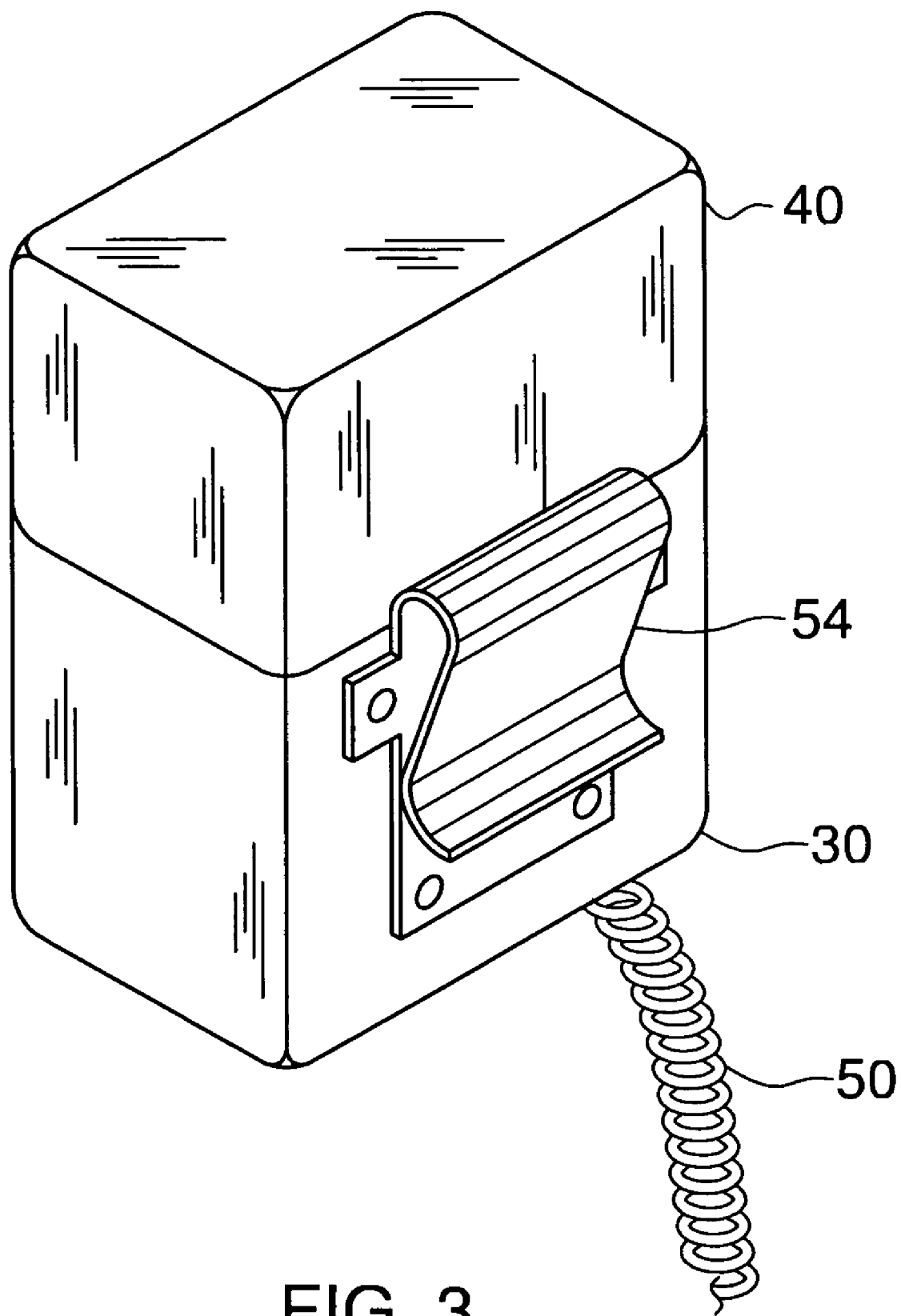
FIG. 3 is a schematic perspective back view of battery and housing the present invention.
Figure 4:
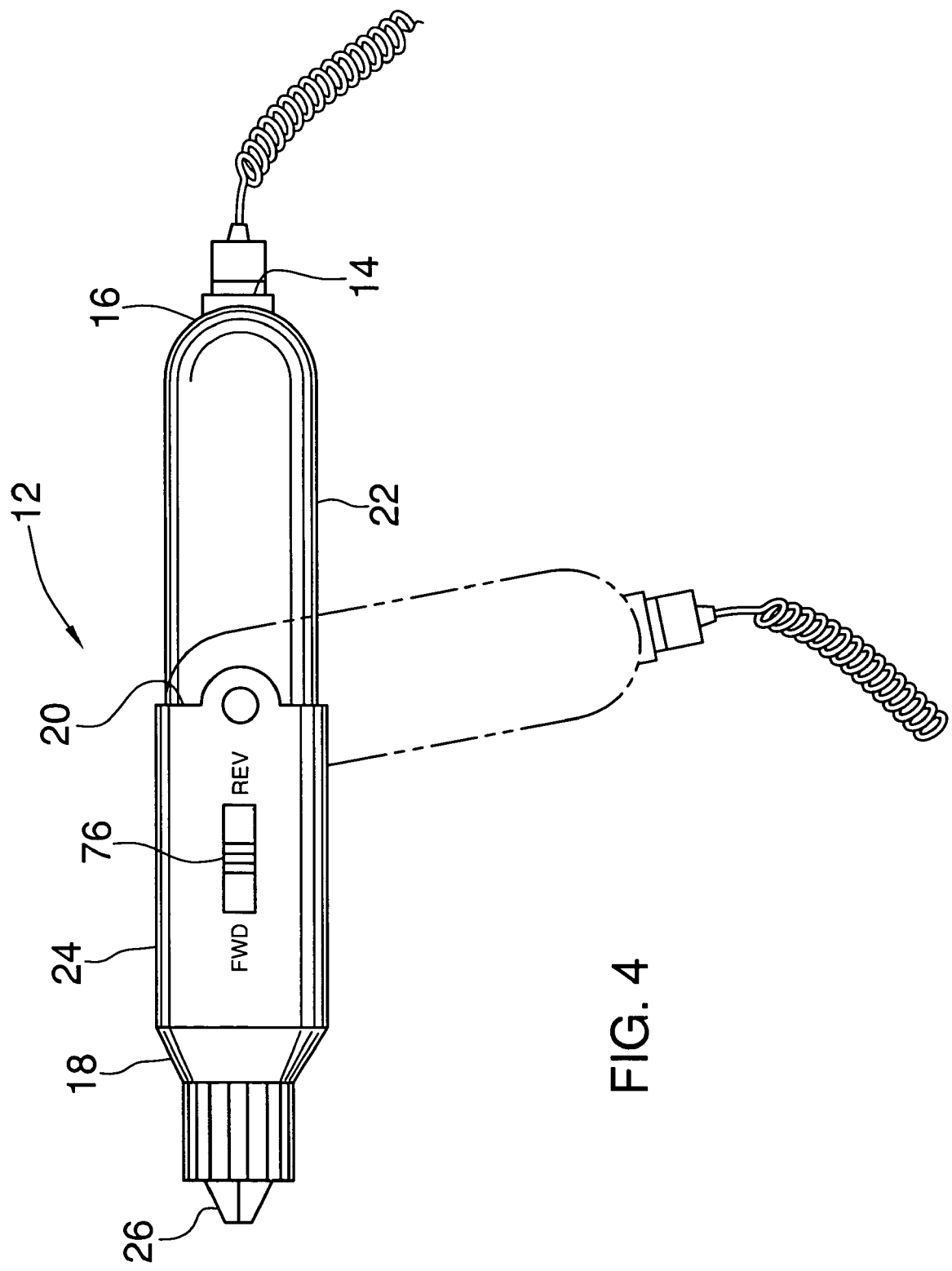
FIG. 4 is a schematic side view of the drill assembly of the present invention.

With reference now to the drawings, and in particular to FIGS. 1 through 9 thereof, a new portable power tool device embodying the principles and concepts of the present invention and generally designated by the reference numeral 10 will be described.

Figure 5:
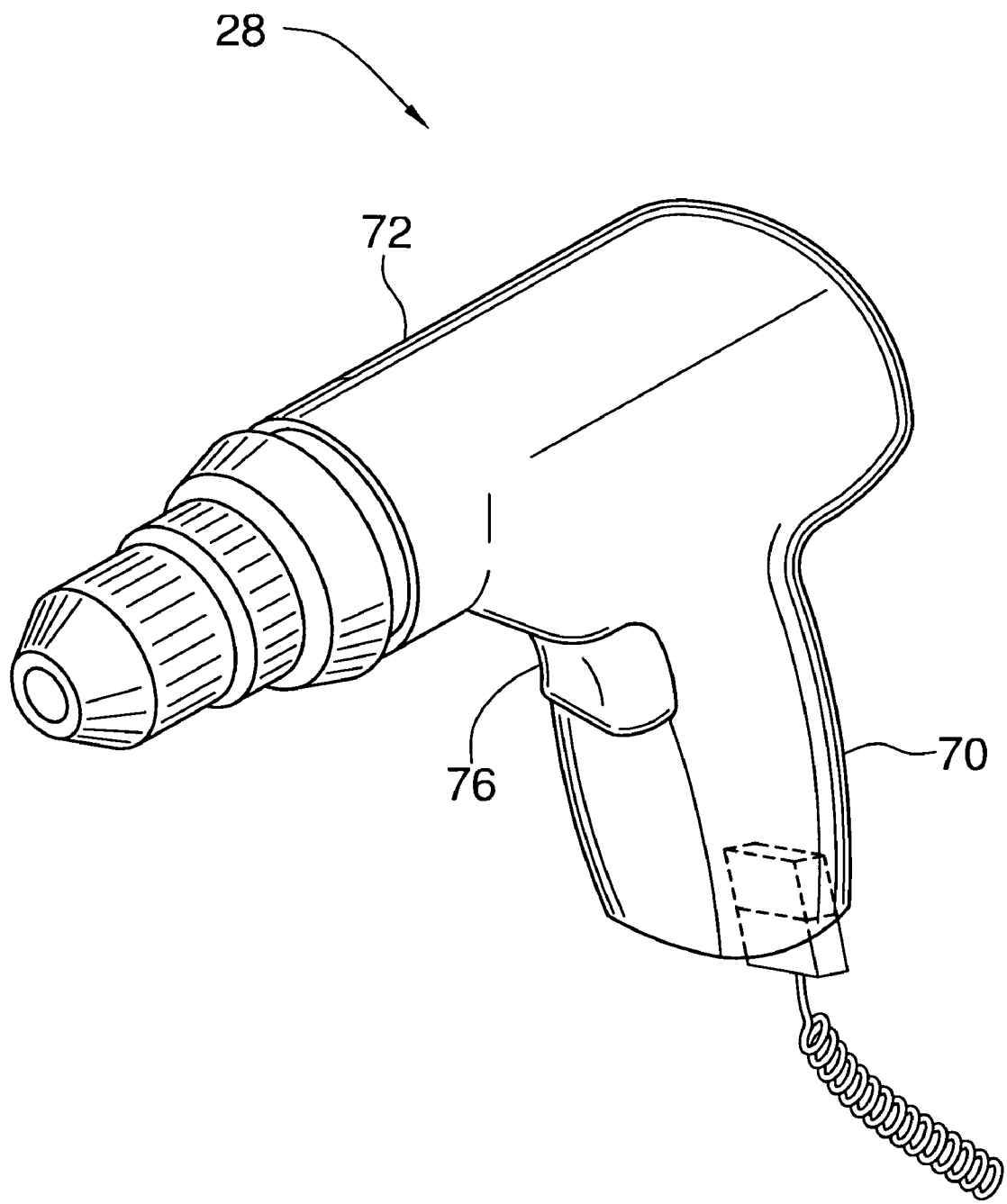
FIG. 5 is a schematic perspective view of a second embodiment of the drill assembly of the present invention.
Figure 6:
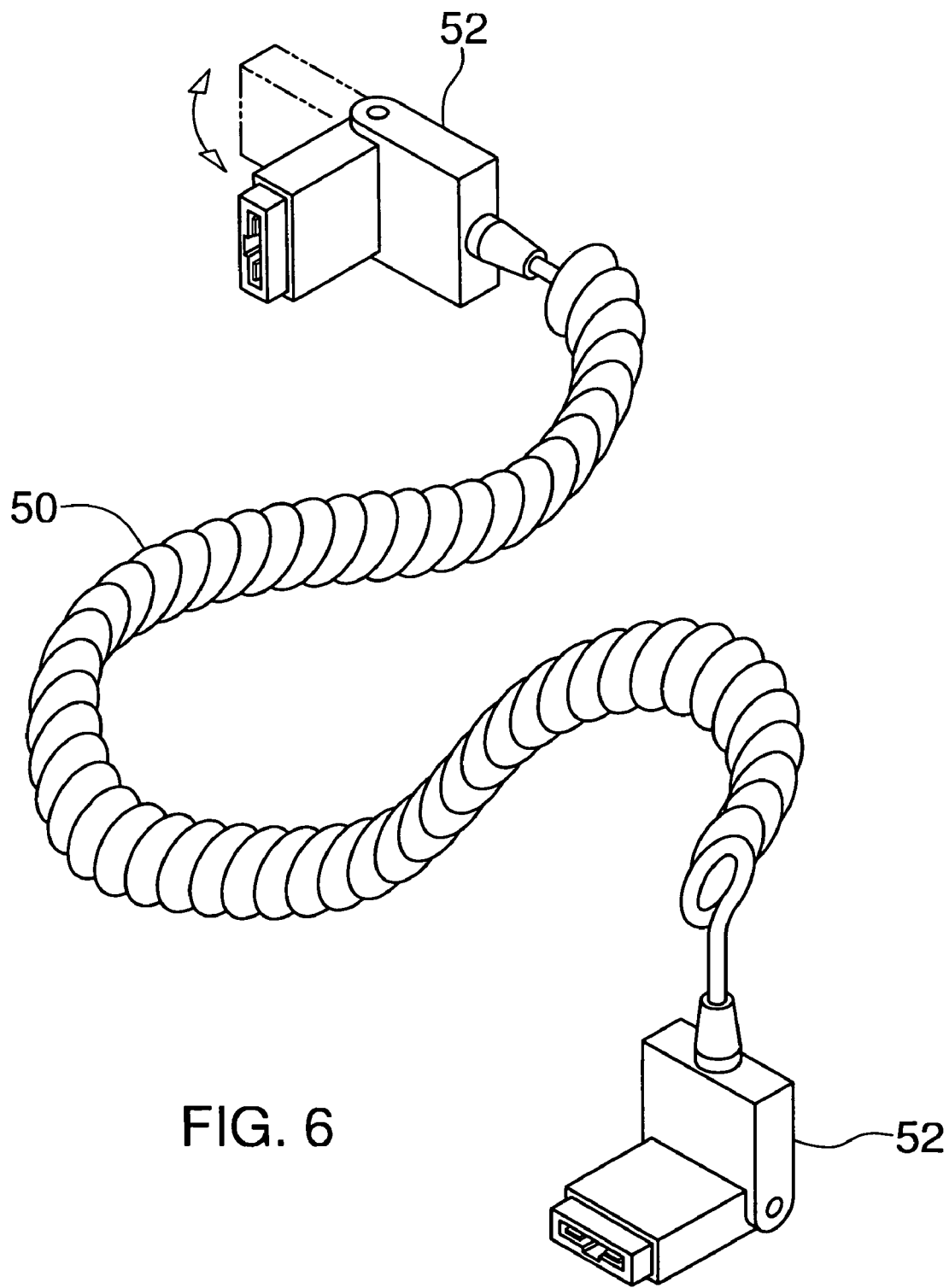
FIG. 6 is a schematic perspective view of a power cord of the present invention.
Figure 7:
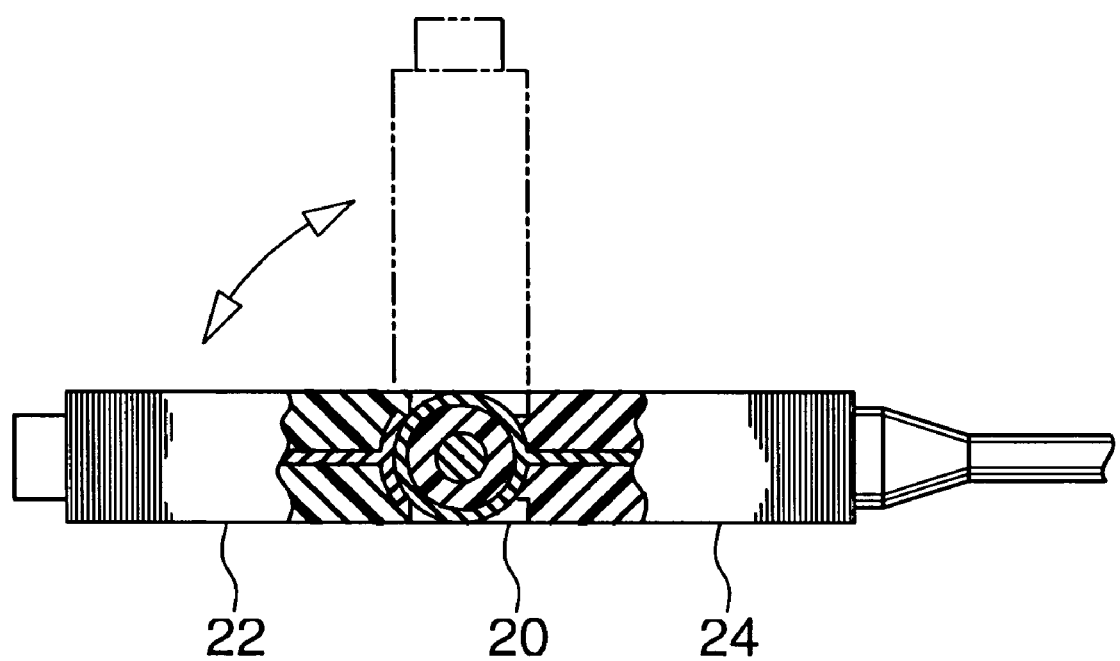
FIG. 7 is a schematic broken view of the drill assembly of FIG. 4 of the present invention.
Figure 8:
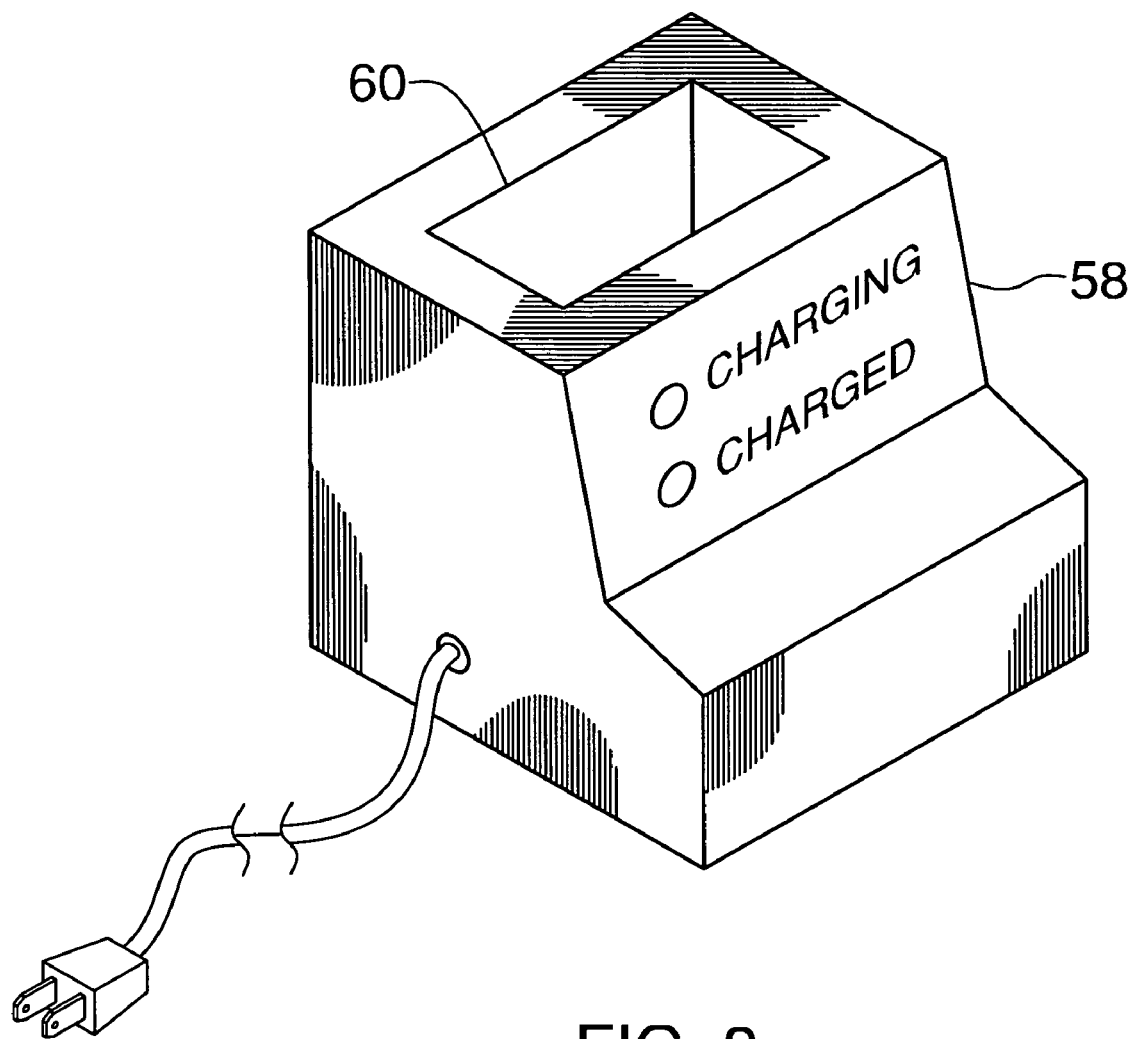
FIG. 8 is a schematic perspective view of a battery charger of the present invention.
Figure 9:
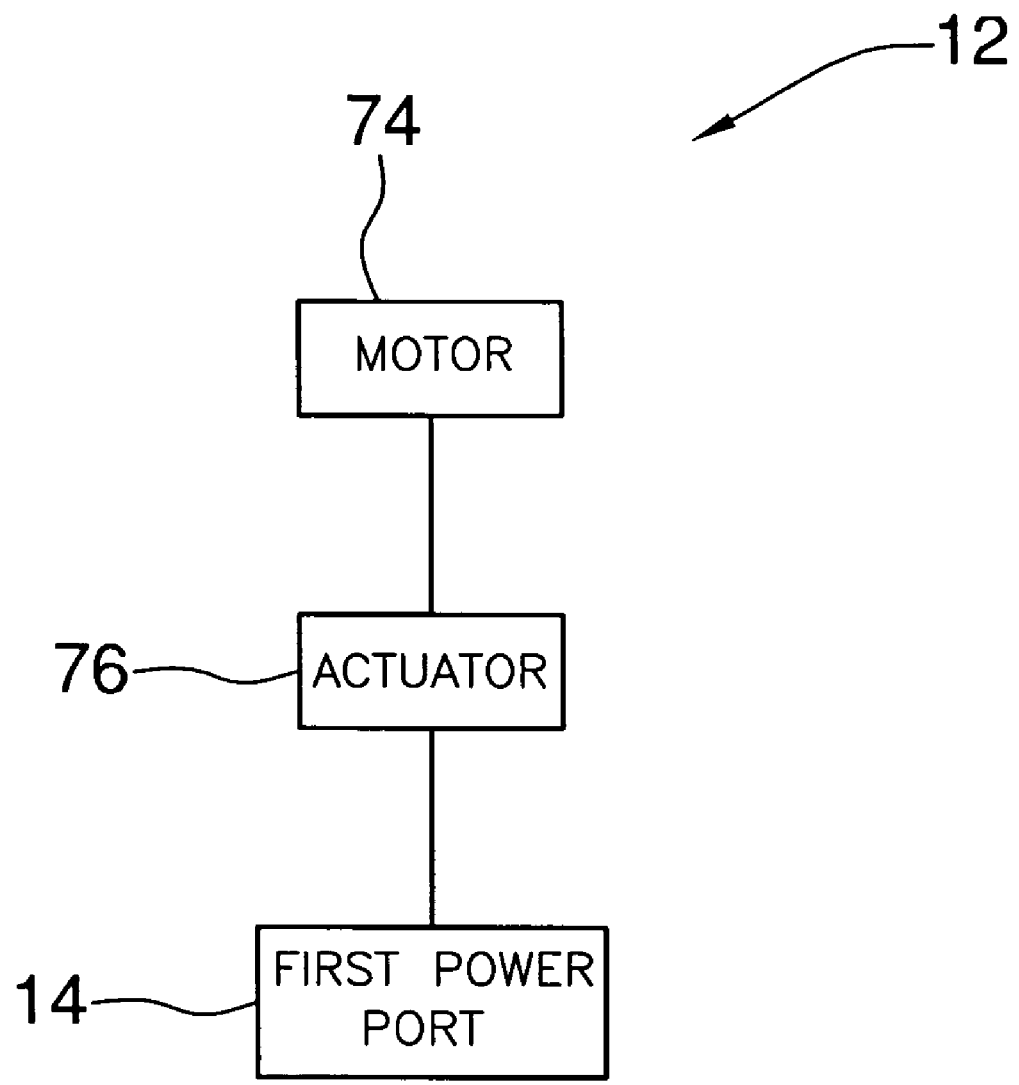
FIG. 9 is an electrical schematic view of the drill assembly of the present invention.

As best illustrated in FIGS. 1 through 9 the portable power tool and power supply combination 10 generally comprises an electrically powered drill assembly 12. A first power poll 14 is electrically coupled to the drill assembly 12. The drill assembly 12 preferably has an elongated and tubular shape and includes a first end 16 and a second end 18. The drill assembly 12 has a break 20 therein such that first 22 and second 24 portions are defined. The first 22 and second 24 portions are pivotally coupled together. The first power port 14 is mounted on the first end 16. A drill bit engaging member 26 is mounted on the second end 18. A second embodiment 28 of the drill assembly is depicted in FIG. 5 and includes a conventional handle 70 attached to the drill housing 72. The drill assembly 12 includes a motor 74 mechanically coupled to the drill bit engaging member 26 and an actuator 76 for selectively turning the motor 34 on or off.

A housing 30 has a bottom wall 32, a top wall 34 and a peripheral wall 36 extending between and is attached to the top 34 and bottom 32 walls. The top wall 34 has a well 38 extending therein. A rechargeable battery 40 is provided. A plurality of electrical contacts 42, 44 is mounted on the battery 40 and in the well 38. The plurality of electrical contacts includes at least a pair of first electrical contacts 42 that are mounted in the well 38 and at least a pair of second electrical contacts 44 is mounted on and electrically coupled to the battery 40. The second electrical contacts 44 are removably positionable in the well 38 and positioned for electrically engaging the first electrical contacts 42 when positioned within the well 38. A second power port 46 is mounted on the housing 30 and is electrically coupled to the first electrical contacts 42. Preferably, an actuator 48 is electrically coupled to the second power port 46 for selectively opening or closing a connection between the second power port 46 and the first electrical contacts 42. A power cord 50 is elongated and includes a first end and a second end. A pair of power couplers 52 is provided and each is adapted for electrically coupling to one of the first 14 and second 46 power ports. Each of the power couplers 52 is electrically coupled to one of the first and second ends of the power cord 50.

A belt clip 54 is attached to the peripheral wall 36 of the housing 30. The belt clip 54 is conventional and mounted generally adjacent to the top wall 34. The peripheral wall 36 includes a plurality of side walls and it is preferred that the belt clip 54 is attached to a different side wall than the second power port 46 and the actuator 48. The combination 10 may also include a conventional belt 56 to which the belt clip 54 may be attached.

Also included may be a battery charger 58 for recharging the battery 40. The battery charger 58 includes a well 60 for receiving the second electrical contacts 44 for electrically coupling the battery charger 58 to the battery 40. It is preferred that the battery charger 58 includes an indication system for indicating when the battery is fully charged.

In use, the drill assembly 12 is used as a conventional power drill. By placing the power supply, or battery 40, on the belt of the user of the drill assembly 12, the user is provided with a more streamlined and lighter drill assembly 12 while having the power of a conventional cordless drill.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable power tool and power supply combination comprising:
    an electrically powered drill assembly, a first power port being electrically coupled to said drill assembly;
    a housing having a bottom wall, a top wall and a peripheral wall extending between and being attached to said top and bottom walls, said top wall having a well extending therein;
    a rechargeable battery;
    a plurality of electrical contacts, said plurality of electrical contacts including at least a pair of first electrical contacts being mounted in said well and at least a pair of second electrical contacts being mounted on and electrically coupled to said battery, wherein said second electrical contacts are removably positionable in said well and positioned for electrically engaging said first electrical contacts;
    a second power port being mounted on said housing and being electrically coupled to said first electrical contacts;
    a power cord being elongated and including a first end and a second end, a pair of power couplers each adapted for electrically coupling to one of said first and second power ports, each of said power couplers being electrically coupled to one of said first and second ends of said power cord.

2. The combination according to claim 1, wherein said drill assembly has an elongated and tubular shape, said drill assembly having a first end and a second end, said drill assembly having a break therein such that a first and second portion are defined, said first and second portions being pivotally coupled together, said first power port being mounted on said first end, a drill bit engaging member being mounted on said second end.

3. The combination according to claim 1, further including an actuator being electrically coupled to said second power port for selectively opening or closing a connection between said second power port and said first electrical contacts.

4. The combination according to claim 3, further including a belt clip being attached to said peripheral wall of said housing.

5. The combination according to claim 1, further including a belt clip being attached to said peripheral wall of said housing.

6. A portable power tool and power supply combination comprising:
    an electrically powered drill assembly, a first power port being electrically coupled to said drill assembly, said drill assembly having an elongated and tubular shape, said drill assembly having a first end and a second end, said drill assembly having a break therein such that a first and second portion are defined, said first and second portions being pivotally coupled together, said first power port being mounted on said first end, a drill bit engaging member being mounted on said second end;
    a housing having a bottom wall, a top wall and a peripheral wall extending between and being attached to said top and bottom walls, said top wall having a well extending therein;
    a rechargeable battery;
    a plurality of electrical contacts, said plurality of electrical contacts including at least a pair of first electrical contacts being mounted in said well and at least a pair of second electrical contacts being mounted on and electrically coupled to said battery, wherein said second electrical contacts are removably positionable in said well and positioned for electrically engaging said first electrical contacts;
    a second power port being mounted on said housing and being electrically coupled to said first electrical contacts;
    an actuator being electrically coupled to said second power port for selectively opening or closing a connection between said second power port and said first electrical contacts;
    a power cord being elongated and including a first end and a second end, a pair of power couplers each adapted for electrically coupling to one of said first and second power ports, each of said power couplers being electrically coupled to one of said first and second ends of said power cord; and
    a belt clip being attached to said peripheral wall of said housing.

* * * * *